United States Patent Office 2,963,453
Patented Dec. 6, 1960

2,963,453
ACRYLIC AND METHACRYLIC ACID RESINS CONTROLLABLY CROSSLINKED WITH POLYALLYL ACRYLATE, ITS SUBSTITUTED DERIVATIVES, AND COPOLYMERS THEREOF

Jesse C. H. Hwa, Levittown, Pa., and Orville H. Loeffler, Haddonfield, N.J., assignors to Rohm & Haas Company, Philadelphia, Pa., a corporation of Delaware No Drawing. Filed Mar. 15, 1957, Ser. No. 646,226

15 Claims. (Cl. 260—2.2)

The present invention relates to ion-exchange resins which are insoluble in water but which have the ability to absorb aqueous solutions upon being placed in contact therewith. More particularly, this invention is concerned with a selective, pH-responsive resin which has a relatively low "swelling capacity" (i.e., capacity for adsorbing liquids which thereby cause the resin to swell) in acidic-aqueous solutions, but has a relatively high swelling capacity in neutral or alkaline solutions.

The prior art has known that, in forming ion-exchange resins, if it is desired to increase the swelling capacity of the product it is necessary to loosely crosslink whatever monomer is employed with a small amount of a suitable crosslinking agent. Many such agents are available, and they are typified by divinyl-benzene which currently is the substance most generally employed for this purpose. Many more such crosslinkers are known, e.g., some forty of them are identified in co-pending applications Serial Nos. 624,744, Patent No. 2,862,894; 624,743, Patent No. 2,862,893; and 642,744, Patent No. 2,874,723; filed on November 28, 1956. However, the use of such crosslinkers in certain applications has been limited by the fact that, when used in small amounts, their behavior is difficult to control in production, and results are very hard to duplicate, as will be explained below.

The prior art has also been aware of applications wherein the ability of a water-insoluble resin to swell many times its normal size upon contacting water is of extreme importance. Resins having the requisite exceptionally high-swelling capacity are known; however, there are certain important cases wherein those normally valuable substances are not usable. One such situation is where the resins are required to pass through one aqueous solution, particularly an acidic solution, with relatively little swelling, but to undergo very considerable swelling upon contacting a second aqueous solution, specifically one that is neutral or alkaline. An example of such a need for selective swelling capacity is the use of resins as a bulk laxative in which it is preferable not to have the swelling occur as the resin passes through the stomach, but to swell instantly upon reaching the intestine. Until now, although the art has known how to provide resins which, by changes in the proportions of their constituents, have either high or low swelling capacities, none has been disclosed which has both capacities selectively available in a single resin.

Accordingly, it is a principal object of the present invention to provide a uniformly loosely crosslinked ion-exchange resin which is insoluble in water, which remains virtually unchanged when in contact with acidic-aqueous solutions, but which swells many times its normal size immediately upon contacting a neutral or alkaline-aqueous solution.

Another object is to provide an ion-exchange resin which has superior qualities as a bulk laxative by virtue of the fact that, without the benefit of any protective coating or other means, it undergoes virtually no swelling as it passes through the stomach but swells an exceedingly high amount upon reaching the intestine.

Still another object is to provide an ion-exchange resin which is a good buffering agent for antacid applications.

A further object is to provide an ion-exchange resin which is a good thickening agent for numerous liquids.

The foregoing, and other objects are accomplished by means of acrylic or methacrylic acid (hereinafter identified as AA and MAA, respectively) resins loosely crosslinked with allyl methacrylate-methylmethacrylate (hereinafter referred to as AMA–MMA) copolymers. The resins preferably are prepared by a convenient one-step solution polymerization of the monomers and any one of a number of anionically polymerized AMA–MMA copolymers as the crosslinking agent. Illustrative of the form which the crosslinker may take are compositions whose components range from 1:1 to 1:9 (i.e., one part AMA and one to nine parts of MMA), and whose molecular weight varies from about 20,000 to about 840,000.

The AMA–MMA copolymer can be prepared in any convenient way known to the art. A suitable procedure is the anion polymerization techniques disclosed in U.S. Patent 2,500,265 to Walling and Snyder and in U.S. Patent 2,608,555 to Bullitt. Details on a solution polymerization process by which this copolymer is employed to crosslink acrylic or methacrylic acid to form the resins of the present invention are given in the examples below. Of course, the invention is not independent upon, nor limited by, this one type of polymerization process; the effective utility of the inventive composition is substantially the same no matter what variation of the anion polymerization method is employed for its preparation.

Since the present invention has been made possible by the unique employment of AMA–MMA as a crosslinker, and further in view of the exceptionally fine crosslinking control afforded by the use of this copolymer, an explanation of the problem solved thereby may be in order. In employing crosslinkers such as divinylbenzene, and the like, the prior art was aware of the fact that only relatively small amounts of the material could be used in order to obtain the loose crosslinking which made ion-exchange resins capable of absorbing large quantities of liquid. The trouble is that when divinylbenzene, trivinylbenzene, divinyl phthalate, etc. are employed at low levels in production it is exceedingly difficult to control their effective action on the substance being crosslinked. Very often the proportion of uncrosslinked polymer, compared to that which is successfully crosslinked, becomes too appreciable even though the amount of the crosslinker and the conditions under which it is employed are the same as in previously successful production runs. The result is that the product often has too high a proportion of water-soluble material, and too little of the insoluble material. Such a resin, consequently, is unsatisfactory for ion-exchange applications as too much of it would be lost when aqueous solutions are passed through the resin columns in accordance with conventional ion-exchange practice.

The present invention overcomes the difficulties experienced with prior art crosslinking agents. In place of a single molecule of divinylbenzene, or the like, having at most 2 to 3 double bonds, there is utilized a molecule of polymeric nature, such as polyallyl methacrylate which contains on the order of 100 or more double bonds (AMA units). This macro-molecule, which can be utilized "as is" for crosslinking purposes, may be considered as a straight chain having its double bonds depending or extending therefrom substantially over its entire length.

Although the AMA is the active crosslinking agent and can function as such alone, it normally is desirable to modify the composition of the molecule by regulating the average distance between the double bonds. This spacing is controllable by selection of a second monomer (MMA) which enters into the copolymerization of the first monomer to form the macro-molecule. Experience has indicated that this spacing makes possible better utilization of the pendant double bonds in the macro-molecule for crosslinking purposes. By virtue of the exceptionally large number of double bonds which the AMA makes available for crosslinking purposes, plus the fact that the proper spacing of those bonds by the intervening MMA greatly facilitates the crosslinking function, a far greater proportion of the insoluble material is produced than when any of the more conventional, prior art crosslinking agents are employed. Moreover, resins made with AMA are readily duplicated, with very little variation, by routine production operations.

A convenient method for forming the AMA–MMA copolymer is to dissolve the two monomers in anhydrous benzene, then react this solution with sodium or potassium sand, according to the procedure of Walling and Snyder described in the aforementioned U.S. Patent 2,500,265. Another method, as described by Bullitt in U.S. Patent 2,608,555, is to rapidly agitate the polymerizable monoethylenic compound in liquid ammonia at extremely low, sub-zero temperatures in the presence of a strong base such as potassium amide. After a short time the strong base is neutralized, e.g., with an acid such as ammonium chloride, and the solid polymer isolated by removing the liquid ammonia and any monomer that happens to remain.

It should be understood that the macro-molecule which forms the crosslinking agent of the present invention need not necessarily be AMA. The parent compound, allyl acrylate, or other substituted derivatives thereof, such as methallyl acrylate or methallyl methacrylate, are also suitable. Whichever one of these crosslinkers is employed, the monomer itself, in its polymerized form, may be used as such or it may be copolymerized in any proportion with MMA. It is also satisfactory to employ the ethyl, propyl or butyl methacrylates in place of the MMA. Preferred ratios of AMA (or other methacrylate or acrylate as mentioned above) to MMA (or the other named alkyl methacrylates) are 1:3 to 1:9. For convenience of reference throughout the balance of this specification only the macro-molecule consisting of the AMA–MMA copolymer will be referred to; however, it should be understood that the substitutes therefor disclosed above are also encompassed by this term.

In preparing the resin of the present invention the AMA–MMA (or any one of the named crosslinkers) may be employed in a range varying from 0.1 to 5.0% of the total polymerizable materials on a molar basis. In practice, however, it is preferred to use at least 0.5%; and for most purposes it generally is unnecessary to use more than 2.0%.

The AMA–MMA copolymer is copolymerized with acrylic acid or methacrylic acid to form the resin of the present invention. Any one of a number of known polymerization processes can be employed such as polymerization in mass, in solvents for the materials being polymerized, or in emulsion or suspension in a liquid which is not a solvent for those materials. The preferred technique is the one-step solution polymerization of the monomer with the AMA–MMA crosslinker. In this process the organic monomer is thinned out by adding thereto an organic, miscible, inert diluent as, for example, toluene, benzene, acetone, dioxane, alcohols such as isopropanol, etc. At the end of the polymerization the diluent will be imbibed by the insoluble resin.

The polymerization of the acrylic or methacrylic acid with the AMA–MMA is facilitated by means of well-known initiators which provide free radicals. These initiators include: ozone, ozonides; organic peroxidic agents such as acetyl peroxide, lauroyl peroxide, stearoyl peroxide, tert-butyl hydroperoxide, benzoyl peroxide, tert-butylperbenzoate, ditert-butyl diperphthalate, ditert-butyl peroxide, and the barium salt of tert-butyl hydroperoxide; inorganic agents such as barium peroxide, sodium peroxide, hydrogen peroxide; azo compounds such as azoisobutyronitrile; and the so-called "per salts" such as the water-soluble perborates, persulfates, and perchlorates. The initiators are employed in suitable amounts ranging from 0.1 to about 2.0% based on the weight of the monomeric material to be copolymerized.

The reaction of the acrylic or methacrylic acid with the AMA–MMA copolymer, generally is carried out between room temperature and the reflux temperature of the solvent, usually between 50° and 100° C. As a rule, polymerization is completed in 5–8 hours, and the product precipitates out as a fine suspension in the solvent media. The product is isolated by filtration and dried to form a fine, white, fluffy powder.

The resins of this invention are, as was earlier pointed out, useful in a number of varied applications. They are especially valuable whenever there is need for an exceptionally high swelling capacity, or for a bulking agent, or a thickening agent. With respect to swelling capacity, the present invention has demonstrated unique and outstanding advantages over prior art resins. Representative of the prior art, and of applications therefor wherein the ability of a water-insoluble resin to swell many times its normal size upon contacting water is of extreme importance, is British Patent 731,226, dated June 1, 1955. Disclosed therein is a polymer which, when formed from acrylic acids, or maleic acid or anhydride, and from 0.10 to 1.0% by weight of a polyalkenyl polyether, is described as being high swelling and termed especially useful in the treatment of various disorders of the human and animal gastro-intestinal tract, etc. As pointed out in that patent, such high swelling polymers are particularly useful in control of edema conditions because, in addition to their inherently high ion-exchange capacity, "their soft, often jelly-like consistency insures more efficient action in the gastro-intestinal tract than the ordinary granular or powder forms of the insoluble, non-swelling ion-exchange resins. Because of their great capacity and ability to hold water tenaciously under osmotic pull, these mucilaginous polymers and their salts also function ideally as bulk laxatives."

Notwithstanding the value of this high-swelling property there are instances when it is undesirable. This is recognized in British Patent 731,226 to the extent that disclosure is made therein of low-swelling polymers prepared, for example, from acrylic acids or maleic acid or anhydride with 5 to 30% by weight of the polyalkenyl polyether. Thus, the art is familiar with polymers which, by varying the proportions or nature of the constituents thereof, can be made to possess either high or low swelling characteristics, as desired.

Although there are considerable advantages in having available polymers which, by selected changes in their composition, are made specific as to the degree of their swelling capacities, there are instances where even they are inadequate. One was suggested earlier, namely the situation when it is desirable to have a substance pass, without any material amount of swelling, through an area where it will be in contact with an acidic aqueous solution, and yet be able to swell many times its normal volume when it comes in contact with an alkaline aqueous solution. One such situation is the use of the high-swelling composition as a bulking compound, particularly as a bulk laxative. In that case it is desirable to have it pass substantially unchanged through the stomach and then to swell after it reaches the intestines. In this way, food that is as yet undigested in the stomach would be subjected to a minimum of the bulk-caused egestive action, but the full effectiveness of the laxative would be experienced in the intestines where wastes to be eliminated normally are collected. Another advantage is that the stomach itself is not subjected to the action of the swollen bulking compound, an important feature when the patient has peptic ulcers, and the like.

Prior to the present invention it has been the practice, in applications similar to the one being described, to coat acid-sensitive substances with gel-forming colloids and the like, an example being a water-insoluble protein, so as to protect the active substance against attack or reaction as it passes through an acidic region, as in the stomach. Such enteric coatings are designed to dissolve after reaching the alkaline region, as in the intestine, whereupon the active substance is enabled to perform its intended function without having suffered any change in its original chemical form or quantity. Illustrations of this prior art practice are to be found in United States Patents 2,390,088; 2,433,244; 2,656,298; and 2,718,667.

Although such coatings are highly effective and useful in protecting against attack acid-sensitive substances which are en route through acidic to alkaline regions, there are obvious economies to be achieved if the coatings could be dispensed with. Furthermore, when the active substances are to be employed in the digestive tract, additional benefits are attainable by virtue of the fact that the introduction of another foreign material therein would be avoided, an objective which generally is extremely desirable.

The present invention has all the advantages which could be supplied by the just described enteric coatings to a normally high swelling resin but with the additional advantage that it requires no such coatings. These benefits are achieved by virtue of the unique selective swelling property of the inventive composition as indicated in Table I which lists the swelling capacities of a sample of the present invention which was exposed to ordinary water and of another that was exposed to alkaline solutions. For comparision, a resin of the type disclosed in the aforementioned British Patent 731,226 was prepared and similarly tested. The comparative results, which are clearly indicative of the unique selective swelling contribution to the art made by the present invention, were as follows:

TABLE I

|  | AA Resin Cross-linked with AMA–MMA | Resin of British Pat. 731,226 |
|---|---|---|
| Cation-exchange capacity (meq./g. dry) | 12.4 | 8.25 |
| Swelling in water (ml./g. dry) | 14 | 95 |
| Swelling in NaOH (ml./g. dry in 0.1 N NaOH) | 100 | 100 |

The manner in which this swelling capacity test was performed is described below introductory to Table III which lists the swelling capacities, in plain water and in dilute alkaline solutions, of a number of other formulations made in accordance with the present invention.

EXAMPLE I

In a two liter, three-neck flask equipped with an efficient stirrer, reflux condenser and thermometer, a mixture of 93 grams glacial methacrylic acid (uninhibited), 7.0 grams of a copolymer of allyl methacrylate-methyl methacrylate (in the ratio of 1:6 by weight and a molecular weight of 30,000) (1.0 gram of active allyl methacrylate), 1.0 gram of benzoyl peroxide and 1600 ml. of benzene is stirred efficiently and refluxed at 80° C. for eight hours. Precipitation of the product commenced after ten–fifteen minutes of heating. The final product-solvent slurry is then filtered on a Büchner funnel. 815 ml. of benzene is recovered as the filtrate. The solvent-laden cake is placed in a flask and submerged in an oil bath maintained at 90°–100° C. With rapid stirring, the benzene that is trapped by the swollen product distills over. 515 ml. of benzene is collected in this manner and the total recovery is 1330 ml. or 83%. The white powder remaining in the flask is then finally dried in an oven at 105° C. for five hours. 96 grams (96% yield) of the crosslinked product is obtained as a white, fluffy powder.

EXAMPLES 2–20

The following examples illustrate further the scope of the preparative conditions. In each case 1% benzoyl peroxide is used as a catalyst and the reaction mixture is heated at 80° C. for five to eight hours. The method of isolation is the same as that described in Example 1. The data are tabulated in Table II.

TABLE II

*Preparation of high swelling acrylic acid-type resins crosslinked by AMA–MMA[a] copolymers*

| Example No. | Monomer [b] | Crosslinking Agent | | | | Solvent [c] | Percent Yield |
|---|---|---|---|---|---|---|---|
| | | Composition AMA–MMA | Molecular Wt. | Percent Agent in Mixt. | Percent Agent AMA in Mixt. | | |
| 2 | MAA | 1:1 | 130,000 | 2 | 1 | T | 94 |
| 3 | MAA | 1:1 | 130,000 | 10 | 5 | T | 94 |
| 4 | MAA | 1:3 | 32,000 | 4 | 1 | B | 79 |
| 5 | MAA | 1:3 | 32,000 | 8 | 2 | B | 86 |
| 6 | MAA | 1:3 | 32,000 | 16 | 4 | B | 96 |
| 7 | MAA | 1:6 | 30,000 | 14 | 2 | B | 92 |
| 8 | MAA | 1:9 | 30,000 | 1 | 0.1 | T | 100 |
| 9 | MAA | 1:9 | 30,000 | 5 | 0.5 | T | |
| 10 | MAA | 1:9 | 30,000 | 10 | 1 | T | |
| 11 | MAA | 1:9 | 30,000 | 15 | 1.5 | T/O | 82 |
| 12 | MAA | 1:9 | 30,000 | 20 | 2 | T | 66 |
| 13 | MAA | 1:9 | 840,000 | 5 | 0.5 | B | 92 |
| 14 | MAA | 1:9 | 840,000 | 8 | 0.8 | B | 100 |
| 15 | MAA | 1:9 | 840,000 | 10 | 1 | B | 100 |
| 16 | AA | 1:3 | 32,000 | 4 | 1 | B | 90 |
| 17 | AA | 1:3 | 32,000 | 8 | 2 | B | 89 |
| 18 | AA | 1:6 | 30,000 | 7 | 1 | B | 91 |
| 19 | AA | 1:9 | 30,000 | 10 | 1 | B | 93 |
| 20 | AA | 1:9 | 840,000 | 10 | 1 | B | 100 |

[a] AMA = allyl methacrylate; MMA = methyl methacrylate.
[b] MAA = methacrylic acid; AA = acrylic acid.
[c] T = toluene; B = benzene; O = octane.

This table lists the swelling data of some of the resins listed in Table II. The cation exchange capacity, CEC, is measured by equilibrating one gram of the resin with 200 ml. of 0.1 N NaOH and 5% NaCl at room temperature for sixteen hours. The excess NaOH is determined by back-titration. The swelling experiments are conducted by equilibrating one gram of the dry powder separately with 50 ml. of deionized water and with 200 ml. of 0.1 N NaOH at room temperature for sixteen hours. The levels of the swollen but insoluble polymer settling at the bottom of a graduated cylinder are then read.

TABLE III

Swelling properties of crosslinked acrylic acid-type polymers swelling

| Example No.[1] | Percent AMA | CEC, meq./g. dry | Swelling | |
|---|---|---|---|---|
| | | | ml./g. dry in water | ml./g. dry in 0.1 N NaOH |
| 4 | 1 | 11.0 | 22 | 116 |
| 1 | 1 | 10.2 | 19 | 82 |
| 7 | 2 | 11.0 | 18 | 100 |
| 9 | 0.5 | 12.4 | 14 | 100 |
| 10 | 1 | 10.3 | 10 | 106 |
| 12 | 2 | 8.6 | 10 | 88 |
| 15 | 1 | 10.5 | 15 | 64 |
| 18 | 1 | 11.4 | 28 | 90 |
| 19 | 1 | 11.9 | 27 | 90 |

[1] No. corresponds with example number in Table II.

As mentioned above, the present invention is also useful as a buffering agent, particularly in antacid applications. This property has made the resins of this invention extremely useful in the treatment of hyperacidity in humans. When mixed with magnesium hydroxide the resins help greatly to maintain the desired pH range of 3 to 5.5 in the stomach.

Two procedures were employed for determining the buffering ability of the resins. One was described by R. S. Murphy in 41 J. Am. Pharm. Assoc., Sci. Ed., 361 (1952); the other was described by A. M. Corrente in 43 J. Am. Pharm. Assoc., Sci. Ed., 242 (1954). In the first method the total capacity for acid absorption of the buffer mixture is measured by adding the acid in prescribed increments and measuring the pH of the mixture until it shows no change for a period between 45 seconds and 10 minutes. The pH at these two time intervals is plotted as a function of the amount of acid added. Following this procedure in testing the buffering capacity of the resin of this invention a curve was obtained, the major portion of which indicated a pH between 3 and 5.5. (The second procedure was similar to the first except that the increments of acid added or smaller and the pH is followed more closely. Following this procedure a similar result was obtained.) In conducting the test a slurry was first prepared from the resin to be tested by mixing 0.25 gram of it with 0.75 gram of magnesium hydroxide in 50 ml. of water. Then, successive 25 ml. portions of 0.1 N hydrochloric acid were added at 10 or 30 minute intervals, and the pH changes determined by means of a potentiometer. In each instance the restoration of the hydrogen ion concentration was quite rapid, and this buffering ability was maintained even as the cumulative additions of the acid became relatively large. This ability is self-evident from an examination of the following graphs.

Buffering Capacities of Compositions Identified as Examples 4 and 10 in Table II 0.1 N HCl added at 10-minute intervals

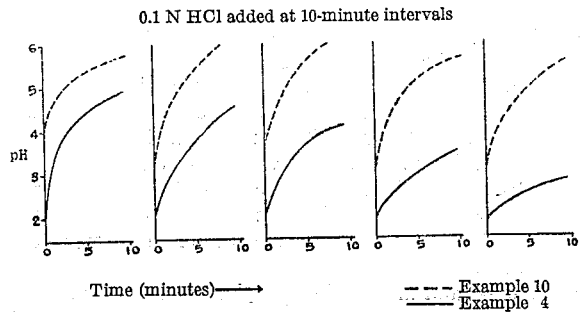

Time (minutes) ⟶
- - - Example 10
——— Example 4

Buffering Capacities of Compositions Identified as Examples 1, 7, and 15 in Table II 0.1 N HCl added at 30-minute intervals

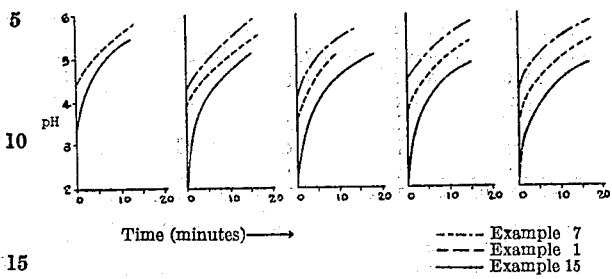

Time (minutes) ⟶
······ Example 7
- - - Example 1
——— Example 15

Buffering Capacities of Compositions Identified as Examples 18 and 19 in Table II 0.1 N HCl added at 30-minute intervals

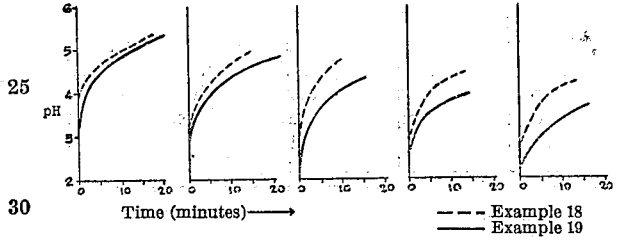

Time (minutes) ⟶
- - - Example 18
——— Example 19

Also mentioned previously is the fact that the invention is useful as a thickening agent. This is due to the face that, by virtue of the high swelling properties of the resins of this invention, they acquire a high viscosity despite a low solid content when they are neutralized to the sodium salt form. This property is taken advantage of in the preparation of numerous industrial cosmetics, in the manufacture of latex and pigmented-latex systems employed in the paint industry, etc. A convenient method of utilizing the resins as thickening agents is to contact them with an alkaline aqueous solution so as to cause them to swell many times their normal size. The thus swollen resin, as such, can be used as a cosmetic or medicinal ointment base, or it can be employed to thicken into pastes various liquids such as inks, dyes, soaps, etc.

The foregoing has described the general nature of the present invention, and has set forth illustrative examples thereof together with typical cases in which it may be usefully employed. It should be clear, however, that we do not intend to be limited only to the examples hereinabove given as the invention has much wider application. Instead, we believe it proper that the invention be considered as fully commensurate with the appended claims.

We claim:

1. An ion-exchange resin comprising an insoluble, crosslinked copolymer of (a) a member of the class consisting of acrylic and methacrylic acids, and (b) a linear and soluble crosslinking agent consisting of a homopolymer of the class consisting of poly(allyl acrylate), poly(methallyl acrylate), poly(allyl methacrylate), and poly(methallyl methacrylate), said crosslinking agent having been prepared by anionic polymerization of the acrylate and methacrylate monomer units only, leaving the allyl side chains substantially intact and therefore available, under conditions of free radical polymerization, for the subsequent crosslinking reaction with said member of the class consisting of acrylic and methacrylic acids, the crosslinking agent being present in an amount varying from 0.1 to 5.0 percent of the total polymerizable materials on a molar basis and having a molecular weight of at least 20,000.

2. The resin of claim 1 in which the copolymer is of acrylic acid crosslinked with poly(allyl acrylate).

3. The resin of claim 1 in which the copolymer is of acrylic acid crosslinked with poly(methallyl acrylate).

4. The resin of claim 1 in which the copolymer is of acrylic acid crosslinked with poly(allyl methacrylate).

5. The resin of claim 1 in which the copolymer is of acrylic acid crosslinked with poly(methallyl methacrylate).

6. The resin of claim 1 in which the copolymer is of methacrylic acid crosslinked with poly(allyl acrylate).

7. The resin of claim 1 in which the copolymer is of methacrylic acid crosslinked with poly(methallyl acrylate).

8. The resin of claim 1 in which the copolymer is of methacrylic acid crosslinked with poly(allyl methacrylate).

9. The resin of claim 1 in which the copolymer is of methacrylic acid crosslinked with poly(methallyl methacrylate).

10. An ion-exchange resin comprising an insoluble, crosslinked copolymer of (a) a member of the class consisting of acrylic and methacrylic acids, and (b) a linear and soluble crosslinking agent consisting of a copolymer of a member of a first class of monomers consisting of allyl acrylate, methallyl acrylate, allyl methacrylate and methallyl methacrylate, and a member of a second class of monomers consisting of methyl, ethyl, propyl and butyl methacrylates, said crosslinking agent having been prepared by anionic polymerization of the acrylate and methacrylate monomer units only, leaving the allyl side chains substantially intact and therefore available, under conditions of free radical polymerization, for the subsequent crosslinking reaction with said member of the class consisting of acrylic and methacrylic acids, the crosslinking agent being present in an amount varying from 0.1 to 5.0 percent of the total polymerizable materials on a molar basis and having a molecular weight of at least 20,000.

11. The resin of claim 10 in which the crosslinking agent is a copolymer of one part by weight of a member of the first class of monomers and from one to nine parts by weight of a member of the second class of monomers.

12. The resin of claim 10 in which the crosslinking agent is a copolymer of allyl acrylate and a member of the class consisting of methyl, ethyl and butyl methacrylates.

13. The resin of claim 10 in which the crosslinking agent is a copolymer of methallyl acrylate and a member of the class consisting of methyl, ethyl, propyl, and butyl methacrylates.

14. The resin of claim 10 in which the crosslinking agent is a copolymer of allyl methacrylate and a member of the class consisting of methyl, ethyl, and butyl methacrylates.

15. The resin of claim 10 in which the crosslinking agent is a copolymer of methallyl methacrylate and a member of the class consisting of methyl, ethyl, propyl, and butyl methacrylates.

References Cited in the file of this patent

UNITED STATES PATENTS

| 2,500,265 | Walling et al. | Mar. 14, 1950 |
| 2,798,053 | Brown | July 2, 1957 |

FOREIGN PATENTS

| 679,562 | Great Britain | Sept. 17, 1952 |